(12) United States Patent
Nelson (10) Patent No.: US 12,530,481 B2
(45) Date of Patent: Jan. 20, 2026

(54) GRANTING RESOURCE ACCESS USING INTEGRATION OF SENSITIVITY DATA TAGS

(71) Applicant: INTERNATIONAL BUSINESS MACHINES CORPORATION, Armonk, NY (US)

(72) Inventor: Mark Nelson, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 18/617,981

(22) Filed: Mar. 27, 2024

(65) Prior Publication Data
US 2025/0307443 A1    Oct. 2, 2025

(51) Int. Cl.
*G06F 21/62* (2013.01)

(52) U.S. Cl.
CPC ................................ *G06F 21/6218* (2013.01)

(58) Field of Classification Search
CPC .... G06F 21/6218; G06F 21/62; G06F 21/604; G06F 21/44; G06F 16/35; H04L 9/32; G06Q 20/40
See application file for complete search history.

(56) References Cited

U.S. PATENT DOCUMENTS

| | | | |
|---|---|---|---|
| 8,260,765 B2 * | 9/2012 | Arbusto | G06Q 10/10 707/709 |
| 8,402,269 B2 | 3/2013 | Bae et al. | |
| 8,589,433 B2 * | 11/2013 | Gawor | G06F 16/353 706/14 |
| 8,656,487 B2 | 2/2014 | Rothman et al. | |
| 9,038,168 B2 | 5/2015 | Ben-Zvi et al. | |
| 9,129,120 B2 | 9/2015 | Garcia et al. | |
| 9,773,102 B2 | 9/2017 | Graham et al. | |
| 10,838,758 B2 | 11/2020 | Lee et al. | |

* cited by examiner

*Primary Examiner* — Brian F Shaw
(74) *Attorney, Agent, or Firm* — Onyx IP Group (57) ABSTRACT

An apparatus includes a processing device; and memory that stores computer program instructions that, when executed, cause the processing device to produce at least one mapped new sensitivity data tag for at least one data resource based on an authorization request for the at least one data resource. The authorization request, such as from a resource manager, includes at least one new sensitivity data tag associated with the at least one data resource. The processing device provides permission to the at least one data resource in response to the authorization request, based on verifying that a user associated with the authorization request has authority over the at least one mapped new sensitivity data tag and over at least one pre-existing sensitivity data tag associated with the at least one data resource. Related methods and computer products are also described.

20 Claims, 7 Drawing Sheets

GRANTING RESOURCE ACCESS USING INTEGRATION OF SENSITIVITY DATA TAGS

BACKGROUND

The present disclosure relates to methods, apparatus, and products for granting access to sensitive data in computing environments.

SUMMARY

According to embodiments of the present disclosure, various methods, apparatus and products for granting access to sensitive data in computing environments are described herein. In some aspects, a process for granting resource access uses integration of data sensitivity tags for data resources that have already been tagged (i.e., pre-existing sensitivity tags) with new sensitivity tags for the same data resource that have different sensitivity tag values (e.g., different data category identifiers). In some implementations, an apparatus includes a processing device; and memory that stores computer program instructions that, when executed, cause the processing device to produce at least one mapped new sensitivity data tag for at least one data resource based on an authorization request for the at least one data resource. The authorization request, such as from a resource manager, includes at least one new sensitivity data tag associated with the at least one data resource. The processing device provides permission to the at least one data resource in response to the authorization request, based on verifying that a user associated with the authorization request has authority over the at least one mapped new sensitivity data tag and over at least one pre-existing sensitivity data tag associated with the at least one data resource.

DETAILED DESCRIPTION

Computing systems employ security servers that use security managers, such as an IBM Resource Access Control Facility (RACF®) for z/OS® which is a security software product, such as a security kernel of the z/OS security server environment that enables the protection of mainframe resources by making access control decisions for users through a suitable interface or series of interfaces such as application programming interfaces (APIs), resource managers (RMs), a system authentication facility (SAF) or other suitable interface. Resource managers issue authorization checks for a user and forwards user access requests to a system authentication facility (SAF) if present in a system. The SAF is an interface that enables programs to use system authorization services, such as security managers to control access to resources, such as data sets and certain commands. The SAF either processes security authorization requests directly or works with the RACF, or other security product, to process them. The SAF router provides a common focal point for all products providing resource control. This focal point encourages the use of common control functions shared across products and across systems. The resource managing components and subsystems call the SAF as part of decision-making functions in their processing, such as access-control checking and authentication-related checking. These functions are called control points. The system authorization facility (SAF) conditionally directs control to the security manager, such as an RACF, when receiving an access request or authentication request from a resource manager. As used herein, a security manager (also referred to as an external security manager) can be part of an SAF, part of another system component, an external security manager or any suitable component that controls access to protected resources in a computing system.

Generally, the security manager processes user authentication requests and user authorization requests. User authentication requests, if granted allow a user to log on to the system and be granted an active session with the system. During an active session, the security manager receives user authorization requests from one or more resource managers. User authorization requests include user access requests to protected system resources such as data resources including data sets, data objects, files, applications, address spaces, as well as devices, ports, and other protected system resources.

The security manager protects system resources by granting access only to authorized users of the protected resources. The security manager retains authorization information about users and resources, in access authorization data structures called profiles in its database, and the security manager refers to these profiles when deciding which users should be permitted access to protected system resources. Major subsystems such as CICS® and Db2® can use the facilities of RACF to protect transactions and files. Sensitive data tagging is a process by which a person, often a computer system administrator, reviews data resources such as files, data sets or other information in a client's data infrastructure and designates certain data resources into different predefined sensitivity categories or classifications by associating one or more sensitive data tag values with a resource identifier for a corresponding data resource. For example, a sensitivity data tag (e.g., value) may represent that a protected resource includes financial information and another sensitivity data tag may represent that a protected resource has personal information in it. Once designated, the sensitivity data tag is associated as an existing or pre-existing sensitivity data tag to the resource. This association is stored in a resource database or other data structure of an external or internal security manager. There can be hundreds of predefined sensitivity tag categories available for the person to choose from in designating a data resource, there can be multiple categories of sensitivity data tags for a data resource, and there can be millions of data resources.

Typically, a user is issued permission to certain categories or types of sensitive data tags. If a user does not have permission over an existing sensitivity data tag in the security database, the security manager denies access and sends a denial reply (e.g., a denial code) to the authorization request.

Artificial intelligence and machine learning applications are being developed that will scour current client data that potentially contains sensitive data and assign one or more new and different sensitivity tag or tags to the same containers (data sets). For example, the new sensitivity data tags correspond to different data type category designations for the same data set. Having different category designations from existing category definitions for the same data set can prevent proper interoperability with new data tagging systems and potentially result in undesired denial of access and/or unauthorized access to protected resources.

In some examples disclosed herein, a security manager, such as RACF, receives a new type of authorization request command, issued for example by a resource manager, as a resource access authorization request, The authorization request includes new sensitivity data tags that have been added to the data resource, by for example a data sensitivity analysis application. The security manager combines existing data categories that are currently in the security manager's database for a resource with the new data categories for the resource received in the new authorization request command. The group of categories are analyzed to see if the user has access to all of the categories in the combined group of categories. For example, when a data set analysis application automatically analyzes and assigns new categories to the same data set, those new categories are sent in the authorization request command to the security manager along with the resource authorization request. The RACF combines, also referred to as integrating, the new categories with the existing categories to see if the user is approved for the combination of the newly assigned and previously assigned categories. Access is granted to the resource when all categories are authorized for the user. In this way, new category findings for already categorized resources are provided. In one example, the SAF routes the authorization requests to the security manager.

In some implementations, an external security manager, such as a RACF, maps the new sensitivity data tags from the authorization request to a set of predefined sensitivity tags, also referred to as categories, and then integrates the mapped sensitivity data tags with any pre-existing sensitivity data tags (category information) that were already assigned for the specific data resource. These combined sensitivity data tags are used to complete the authorization check. The disclosed mechanism easily accommodates new data tags that are assigned to the same data set when the tag categories do not match with the predefined categories of the security server.

A user includes user devices, executing software programs or any other entity that has an identifier associated therewith, or can be identified from data in the system, and is issued an authorization request to access a protected system resource such as a device, data sets, applications, other software code, or other defined system resources. As used herein a user, also referred to as an end user device, also includes a group of users in some implementations.

Figure 1:
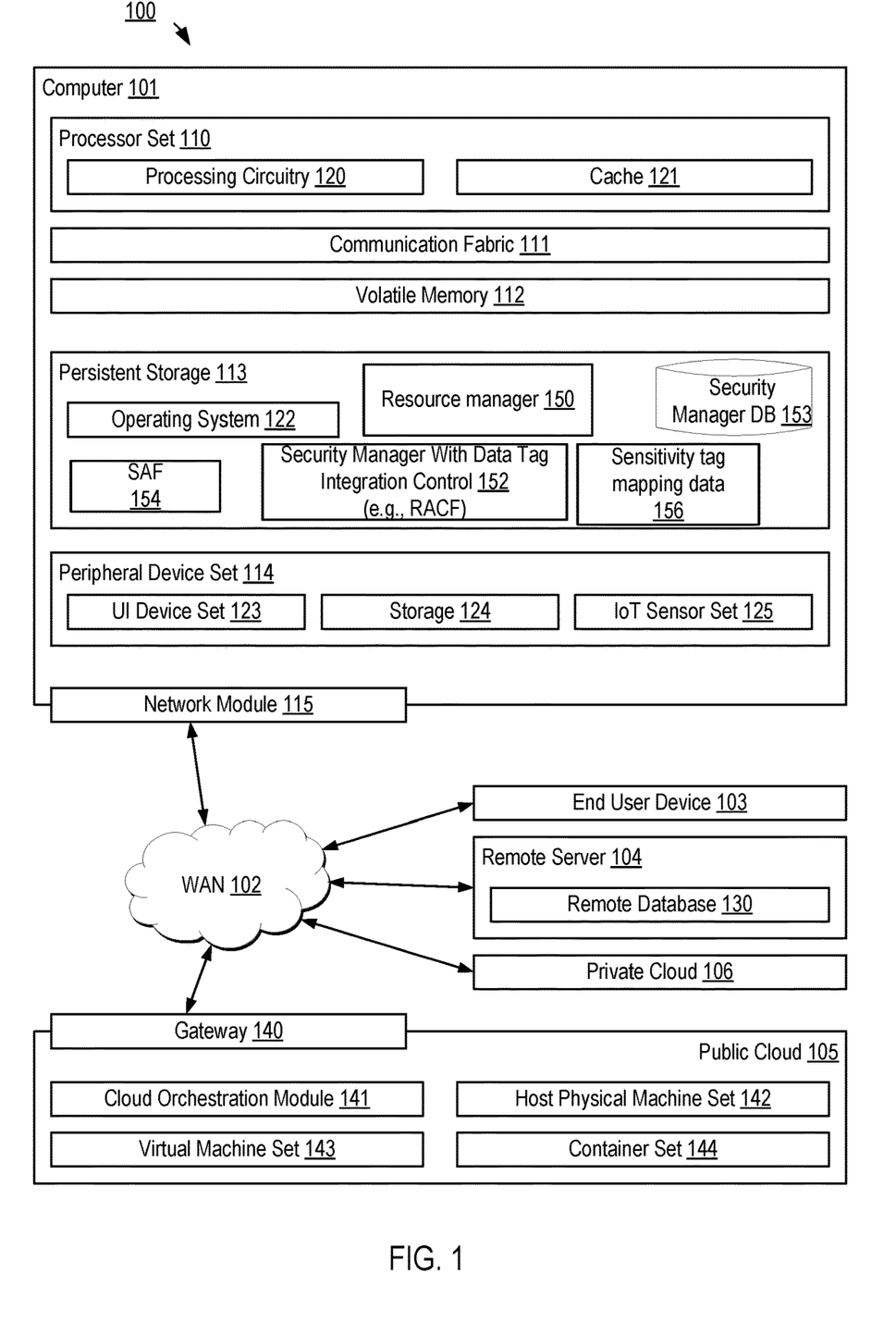
FIG. 1 sets forth an example computing environment according to aspects of the present disclosure.

With reference now to FIG. 1, FIG. 1 sets forth an example, computing environment according to aspects of the present disclosure. Computing environment 100 contains an example of an environment for the execution of at least some of the computer code involved in performing the various methods described herein, such as a resource manager 150 and a security manager 152 with data tag integration control. In addition to a resource manager 150 and a security manager 152 with data tag integration control, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 that includes stored executable instructions including an operating system 122, the resource manager 150, the security manager 152 with data tag integration control (e.g., part of a security server), an SAF 154 if desired, a security manager database 153, sensitivity tag mapping data 156, peripheral device set 114 (including user interface (UI) device set 123, storage 124, and Internet of Things (IoT) sensor set 125), and network module 115. Remote server 104 includes remote database 130 such as a client server that includes protected resources that are protected by the security manager 152. Public cloud 105 includes gateway 140, cloud orchestration module 141, host physical machine set 142, virtual machine set 143, and container set 144.

Computer 101 may also be referred to as a computing system and may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Such computer processors as well as graphic processors, accelerators, coprocessors, and the like are sometimes referred to herein as a processing device or processing circuitry. A processing device and a memory operatively coupled to the processing device are sometimes referred to herein as an apparatus. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in resource manager 150 and security manager 152 typically includes at least some of the computer code involved in performing the computer-implemented methods described herein. Security servers, security administrators and security managers are implemented by the processor set which may be implemented across multiple hardware systems including multiple hardware servers. In some examples the security servers, security administrators and security managers are one or more processors executing software code modules. For purposes of explanation, in one example, the security manager 152 will be described as being an RACF, however it will be recognized that the operations may be implemented by any security manager or other suitable component.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
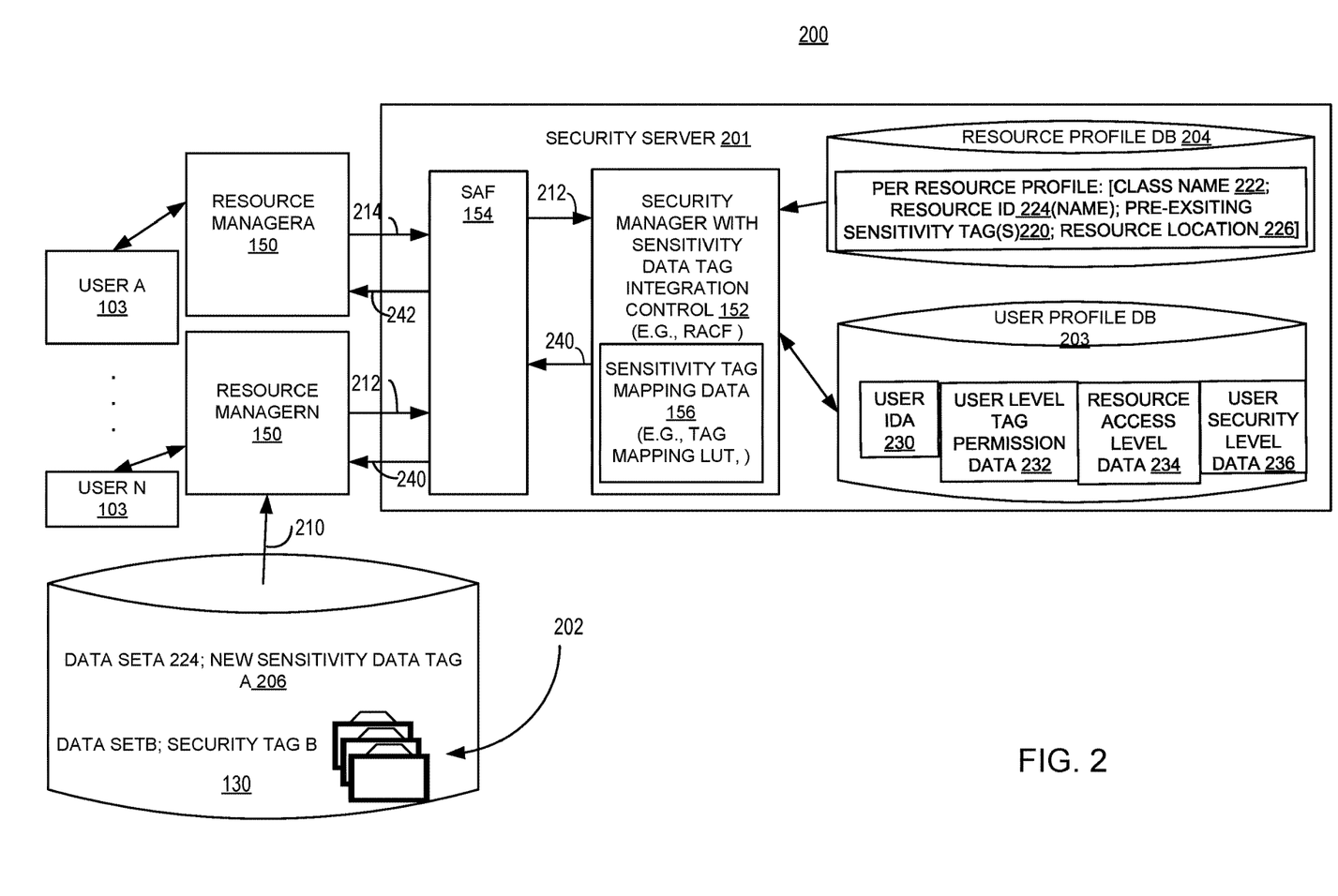
FIG. 2 sets forth an example computing environment according to aspects of the present disclosure.

Referring now to FIG. 2, FIG. 2 sets forth a block diagram of an example computing environment 200 similar to computing environment 100. In this example, a security server 201 includes the security manager 152 with sensitivity data tag integration control as part of an RACF operating in a z/OS environment. However, the operations described herein may be implemented in any suitable environment and may be incorporated into any suitable component as desired. The arrows illustrate communication paths among the components, such as communication buses, service calls, API calls, or any suitable communication mechanism. Also in this example, the security manager 152 includes a security manager database 153 that includes a user profile database 203 and a resource profile database 204. As further set forth below, the user profile database 203 includes user profiles that contain data representing, inter alia, sensitivity tag permissions at a user level. The resource profile database 204 includes for each protected resource in the database 130, one or more assigned sensitivity tags which are referred to as a pre-existing sensitivity tag 220. In this example, an entry in the database for each resource (e.g., on a per resource basis) that is protected by the security manager includes data representing a defined class name 222, such as an identifier that indicates the type of resource (e.g. a data set or a data object); a resource identifier 224, such as the identifier for the resource 202, and the location of the resource (e.g., path name etc.), shown as resource location data 226.

In this example, a user profile in the user profile database 203 includes data representing a user identifier 230, user level tag permission data 232, resource access level data 234, and user security level 236. In this embodiment, the user level tag permission data 232 includes a list of sensitivity data tags (e.g., values for approved categories) from a group of predefined sensitivity tags that the user is permitted to access, such as financial information, personal information of others and any other categories as selected by an administrator. The resource access level data 234, indicates what access level the user is permitted to use for resources such as one or more of read, update, copy or other permissions to resources. The user security level 236 in this example is based on a permitted Bell-Lapadula classification system. The disclosed sensitivity tag integration process does not impact the Bell-Lapadula classification system for user level security and therefore is consistent with security processes for security managers.

In this example, the remote database 130 stores client data resources, such as client data sets, data objects, files, applications or other data resources along with corresponding new sensitivity data tags that were generated for example by a data analysis application. Each resource 202 (a data set such as a file) includes a resource identifier such as a name, and location. A data set for example may have their own resource identifier 224 and associated new sensitivity data tag 206. The sensitivity data tags are new because they represent new categories that are not the same categories represented by the group of predefined categories used to assign the pre-existing sensitivity data tags 220 that are in the resource profile database 204. For example, the tag values are different and/or in a different format from those used to assign the pre-existing sensitivity data tags. The disclosed process converts through mapping data 156, the new sensitivity data tags to one (or more) of tags in the group of predefined categories of the security manager.

In some implementations, in response to a user 103 (e.g., user device) requesting access through a corresponding resource manager 150, the user 103 provides the resource identifier 224 for example for data set A which is the resource sought to be accessed by the user. The resource manager 150 uses the provided resource identifier 224 as an index to fetch, shown by arrow 210, all associated new sensitivity data tag 206 for the requested resource from the client remote database 130, and generates and sends the authorization request 212 for the security manager 152 that includes the new sensitivity data tag 206 associated with the data resource 202. In other implementations the new sensitivity data tag is included with the request by way of a pointer or other designation. In some implementations, a corresponding resource manager 150 generates an authorization request 212 or 214, with the new sensitivity data tag, or list of new sensitivity data tags associated with the resource such as a file, data set or other type of protected data resource. For example, the new sensitivity data tag 206 are sent when a request for data set A 202 is made in some implementations. When the same resource has a plurality of new sensitivity data tags, all new sensitivity data tags are sent by the resource manager in the authorization request 212.

In this example, in response to the authorization request from the resource manager, the SAF calls the security manager 152 and routes the authorization request 212 to the security manager. However, it will be recognized that an SAF need not be employed and is shown as just one example. It will be recognized that the various operations described herein may be split or combined among the various components.

Figure 3:
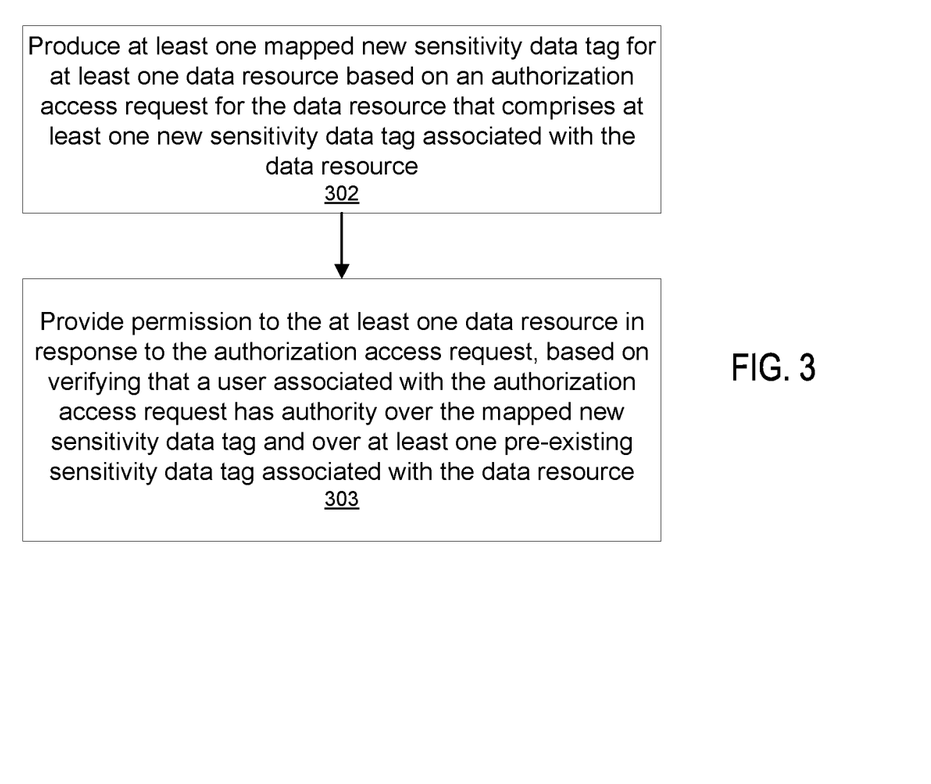
FIG. 3 sets forth a flowchart of an example process for granting resource access using integration of data sensitivity tags according to aspects of the present disclosure.
Figure 4:
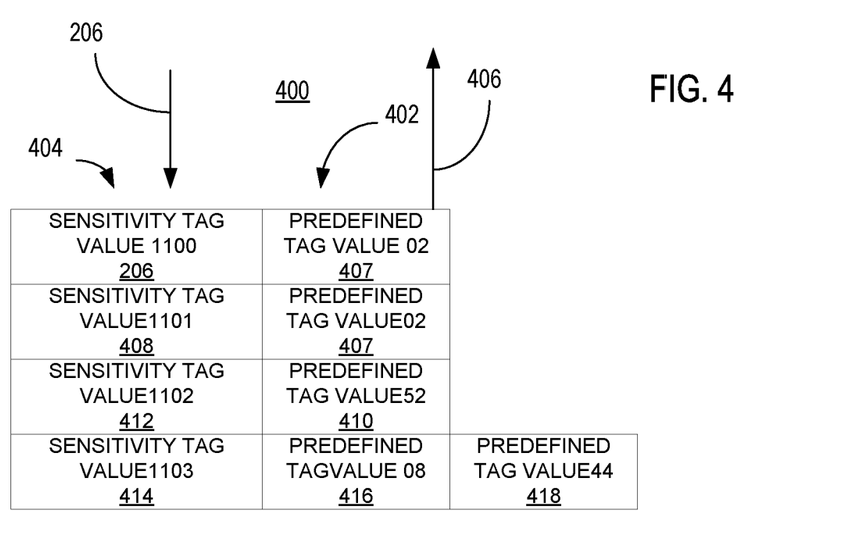
FIG. 4 sets forth an example of sensitivity tag mapping data according to aspects of the present disclosure.

Referring to FIG. 3 and FIG. 4, FIG. 3 is an example method for granting resource access using integration of data sensitivity tags is shown. FIG. 4 illustrates one example of sensitivity tag mapping data 156 in the form of a look up table 400. The sensitivity tag mapping data 156 in this example is a look up table stored in memory but may be another type of data structure or may be a tag translation formula or other suitable mechanism to convert new sensitivity tags (values) to those that match values corresponding to a set of predefined sensitivity tags that were used to assign the pre-existing sensitivity data tags 220 already stored in the resource profiles. The mapping data in this example includes the table 400 that includes data representing a plurality of stored predefined sensitive data category identifiers 402 each associated with one or more corresponding new sensitivity data tags 404. In this example, the plurality of stored predefined sensitive data category identifiers 402 are from a set of 250 predefined categories used to assign the pre-existing sensitivity data tags 220 already assigned to the data resources before the data analysis was done that assigned new sensitivity data tag 206 to the same data resources. In some implementations, the mapping data is provided by the manufacturer of the analysis application and downloaded as part of a registration session. In one example a customer or security administrator securely provides the mapping table which is stored in a secure manner by the security manager.

Referring again to FIG. 3, the method can be performed by any suitable component or components and in any suitable order and in this example is carried out by the security manager 152. For illustration purposes only, access is requested by the user to a data resource having resource ID 224 which has new sensitivity tag 206 assigned by the analysis process in remote database 130. As shown in block 302, the method includes producing, such as by the security manager 152, at least one mapped new sensitivity data tag 406 for the data resource 202 based on the received authorization request 212 for the data resource 202 (e.g., a data set). The received authorization request 212 includes in this example the new sensitivity data tag 206 associated with the data resource 202. By way of example, producing the mapped new sensitivity data tag 406 includes converting, the new sensitivity data tag 206 to at least one predefined sensitivity data tag 402 from a group of predefined sensitivity data tags, such as the 250 possible categories of sensitive data tags used by the security manager. In this example, the table 400 links possible new sensitivity data tags 404 to one or more predefined sensitivity data tags 402. When a lookup is performed, the linked predefined sensitivity tag 402 from the table is fetched and serves as the mapped new sensitivity data tag 406 for use by the security manager. The possible new sensitivity data tags 404 are converted to the predefined sensitivity data tag values from the table 400.

In this example, new sensitivity data tag 206 having a tag value of 1100 is mapped to predefined sensitivity tag 407 that has a tag value of 02. New sensitivity data tag 408 having a tag value of 1101 is also mapped to the same predefined sensitivity data tag 407. New sensitivity data tag 412 having a value of 1102 is mapped to predefined sensitivity data tag 410 having a value of 52 and new sensitivity data tag 414 having a value of 1103 is mapped to both predefined sensitivity data tag 416 having a value of 08 and to predefined sensitivity data tag 418 having a value of 44. In this example, only a portion of the lookup table 400 is shown but the table is populated with all existing sensitivity data tags (e.g., categories) available in user profiles and in the resource profiles to all possible new sensitivity tags. It will be recognized that not all of the sensitivity data tags map to all 250 predefined tags. The table is programmable and is updated to include more mappings when new sensitivity data tags are added in the client remote database 130. It will be recognized that the tag values can be any suitable value including characters.

As shown in block 303, the method includes providing permission, such as by the security manager 152, to the data resource 202 in response to the authorization request 212, based on verifying that the user (e.g., user identifier) associated with the authorization request 212 has authority over the mapped new sensitivity data tag 406 and over at least one pre-existing sensitivity data tag(s) 220 associated with the data resource. For example, the security manager verifies user authority over the mapped new sensitivity data tag 406 and the pre-existing sensitivity data tag 220 associated with the data resource 202 based on user level tag permission data 232. For example, if user level tag permission data 232 is two pre-existing sensitivity data tags namely tags 407 and 410 and the mapped new sensitivity data tag is tag 407, and the pre-existing sensitivity data tag 220 for the corresponding resource is tag 410, authority is granted because the combination of the mapped new sensitivity data tag (407) and the pre-existing tag associated with the resource (410) match the two approved tags (407 and 410) represented by the user level tag permission data. When the authority is verified, the security manager sends an authorization reply 240 to the authorization request 212, such as a code, or reply 242 indicating that access is granted based on the verification. Where the security manager is an RACF, the authorization request takes the form of RACROUTE REQUEST=AUTH command and is modified to include the new sensitivity tag data.

Figure 5:
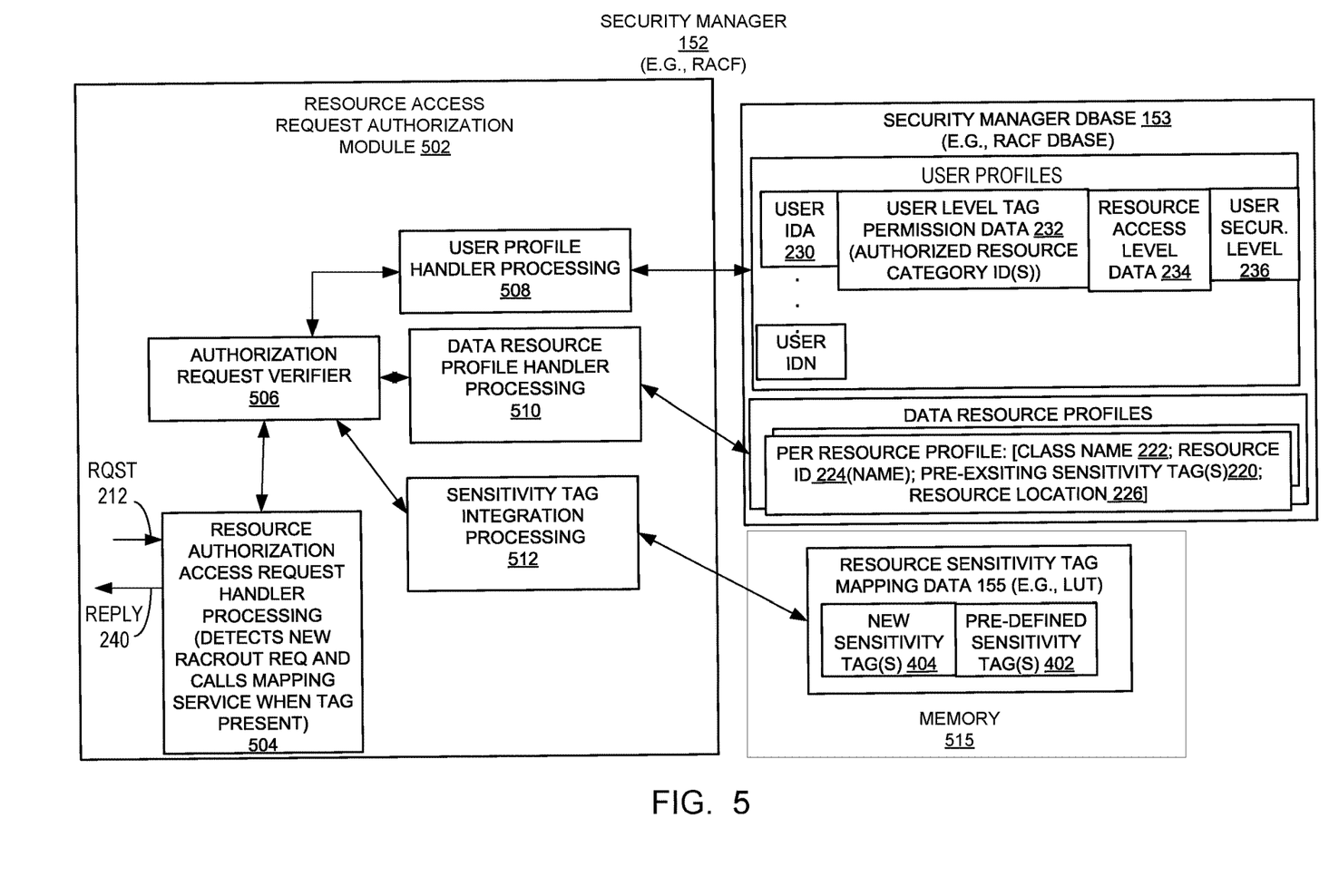
FIG. 5 sets forth an example security manager according to aspects of the present disclosure.

FIG. 5 sets forth an example security manager according to aspects of the present disclosure. In this example the security manager 152 includes a resource access request authorization module 502 that includes multiple processing components, that are implemented by one or more processors executing code. In this example, the resource access request authorization module 502 includes code modules that when executed cause the processor to provide resource authorization access request handler processing 504, authorization request verifier 506, user profile handler processing 508, data resource profile handler processing 510 and sensitivity tag integration processing 512. In this example the resource sensitivity tag mapping data 155 is in the form of a lookup table stored in memory 515 such as programmable nonvolatile memory.

Figure 6:
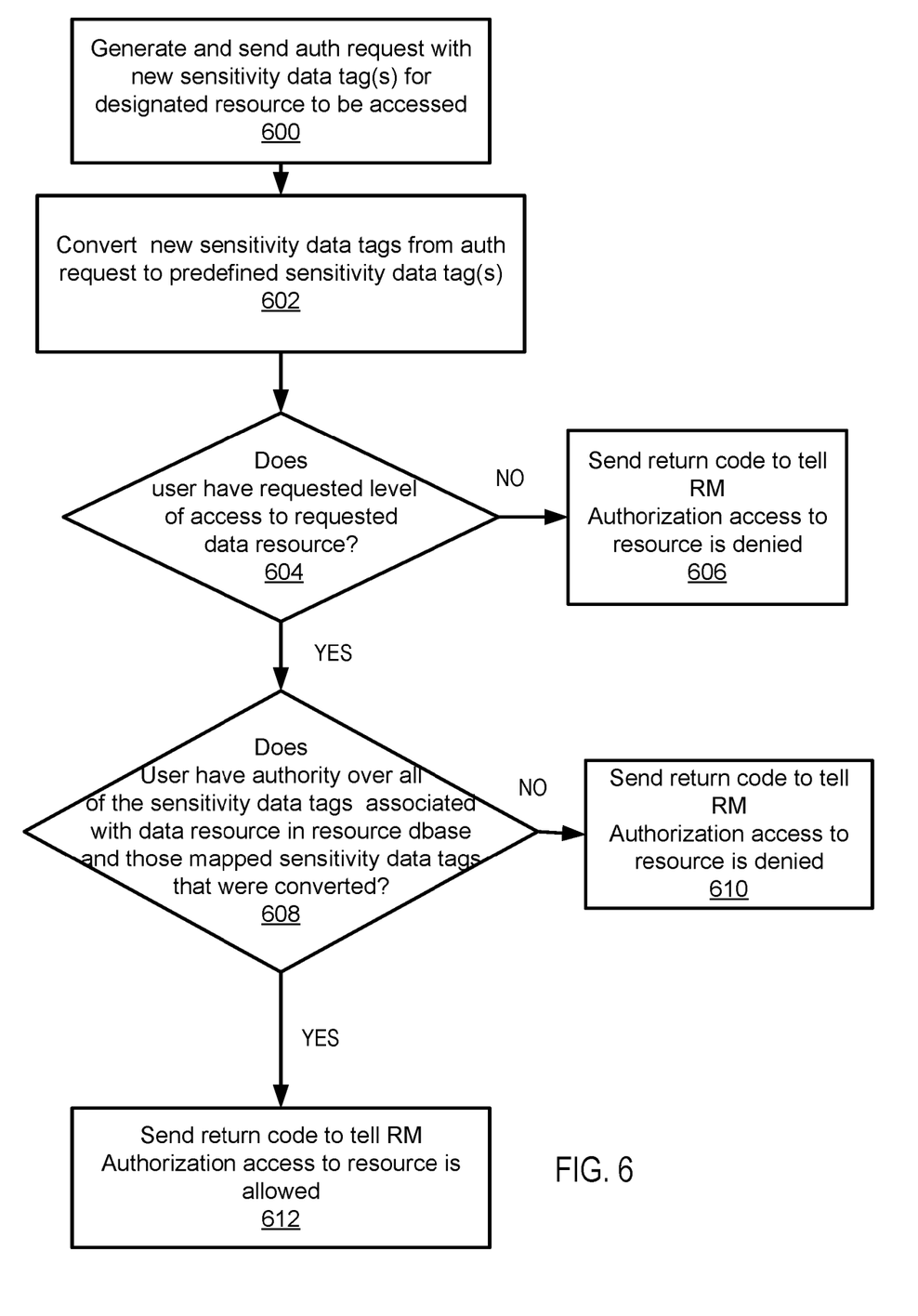
FIG. 6 sets forth a more detailed flowchart of an example process for granting resource access using integration of data sensitivity tags according to aspects of the present disclosure.

Referring now also to FIG. 6, FIG. 6 sets forth a flowchart of a more detailed example of a process for granting resource access using integration of data sensitivity tags according to aspects of the present disclosure. In some implementations the portions of the process are performed by the resource access request authorization module 502, however any suitable component may carry out the process and the process operations may be split among multiple components as desired. Also, operations may be carried out in any suitable order as desired. The arrows represent communication using any suitable mechanism including calls among executing software components, API calls or any suitable communication method. As shown in block 600, the process includes issuing the authentication request that includes the new sensitivity data tag for a designated resource to be accessed. This may be done for example by the resource manager receiving a request from a user device that includes the user ID and resource ID of the resource to be accessed. In one example, the resource manager generates the authorization request 212 by obtaining from the database 130, the corresponding new sensitivity tag data such as new tag 206 if the resource ID referenced data set 202. The authorization request 212 in one example is a RACF RACROUTE REQUEST=AUTH command modified to include the new sensitivity data tag(s) obtained from the database 130 or other source. The new sensitivity data tag has a different value from the predefined sensitivity tags for a same data resource and is converted to a pre-existing data tag that is in the resource profile database and in the user profile database.

The resource authorization access request handler processing 504 detects that the authorization request 212 includes a field or other attribute designating the new sensitivity data or list of tags and informs the authorization request verifier 506 that a sensitivity data tag integration operation is needed. In other implementations a header or other data element indicates that the authorization request requires a sensitivity data tag integration operation. As shown in block 602, the process includes producing the mapped new sensitivity data tag 406 by converting new sensitivity data tags from the authorization request 212 to predefined sensitivity data tag(s) 402. For example, incoming new sensitivity data tags are mapped to defined RACF category(s) via the mapping data 155 by the sensitivity tag integration processing 512 as set forth above. As shown in block 604, the process includes determining if the user has the permitted requested level of access to the requested data resource in the request. For example, the user profile handler processing 508 accesses the user profile and uses the user ID 230 in the request to look up the corresponding resource access level data 234. It passes the information on to the authorization request verifier 506 that checks if the resource access level data 234 in the user profile matches the resource access level data 234 in the authorization request 212. As shown in block 606, if no match exists, the authorization request verifier 506 instructs the resource authorization request handler processing 504 to send a reply 240 with a return code informing the resource manager that authorization request to the resource is denied. However, as shown in block 608, if a match exists meaning that the user has the requisite access level of permission (e.g., read and/or update access for the resource) the process continues and the authorization request verifier 506 obtains the needed data from each of the user profile handler processing 508, the data resource profile handler processing 510 and sensitivity tag integration processing 512 components to determine if the user has authority over both the mapped new sensitivity data tag and the pre-existing sensitivity data tags from the resource profile.

For example, the authorization request verifier 506, based on the authorization request, causes the user profile handler processing 508 to access the user profile corresponding to the user ID in the request. The user profile for a user includes the allowed user access level data 234 and user level tag permission data 232, which in one example, is one or more administrator defined user level permitted sensitivity tag identifiers or data categories the user is permitted to access. The authorization request verifier 506 causes the data resource profile handler processing 510 to access the resource profile using the resource ID in the request and obtain the corresponding pre-existing sensitivity tag(s) associated with the resource, such as a data set, and the location of the data set. Location data is used when the same data set name is used but they are stored in different locations, such as in different volumes. The authorization request verifier 506 causes the sensitivity tag integration processing 512 to use the mapped new sensitivity data tag or tags that resulted from a lookup in the table 400 and provides permission to the at least one data set based on the mapped new sensitivity data tags matching with the user level tag permission data of the user profile and the at least one pre-existing sensitivity data tag in the resource profile also matching with the user level tag permission data of the user profile.

For example, when the user level tag permission data are a plurality of pre-existing sensitivity data tags in the user profile, each of the corresponding tag values in the user profile are compared to each tag value in the group of the tag values of the mapped new sensitivity data tags and tag values from the pre-existing sensitivity tags from the resource profile. When each of the tags in the group are found to match a tag at the user level, namely the user level tag permission data, permission to the resource is granted. For example, as shown in block 612, the authorization request verifier causes the resource ace request hander to issue a reply 240, such as a code, indicating permission is granted. If not, as shown in block 610, permission is denied.

Figure 7:
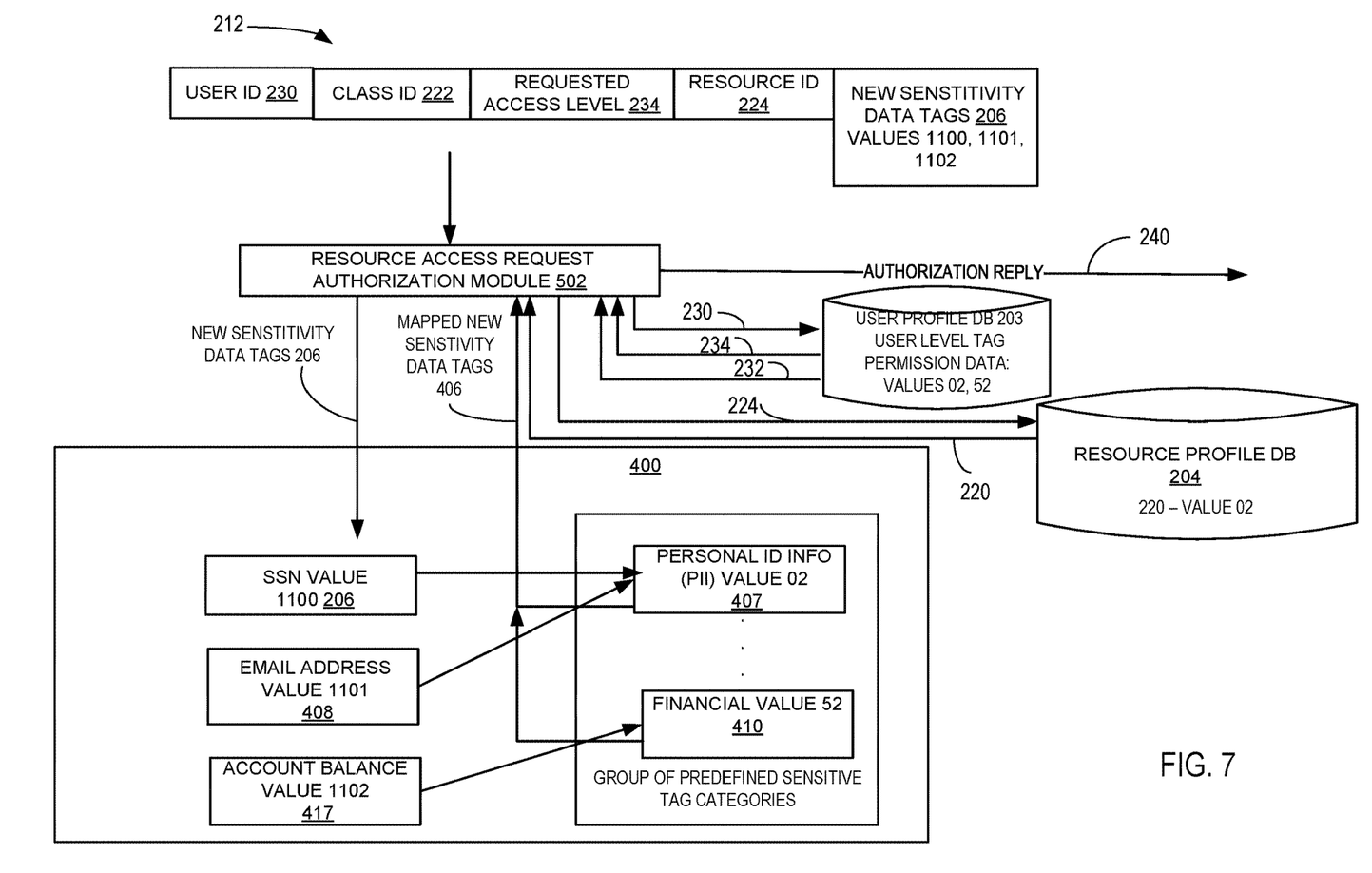
FIG. 7 sets forth an example security manager according to aspects of the present disclosure.
Figure 8:
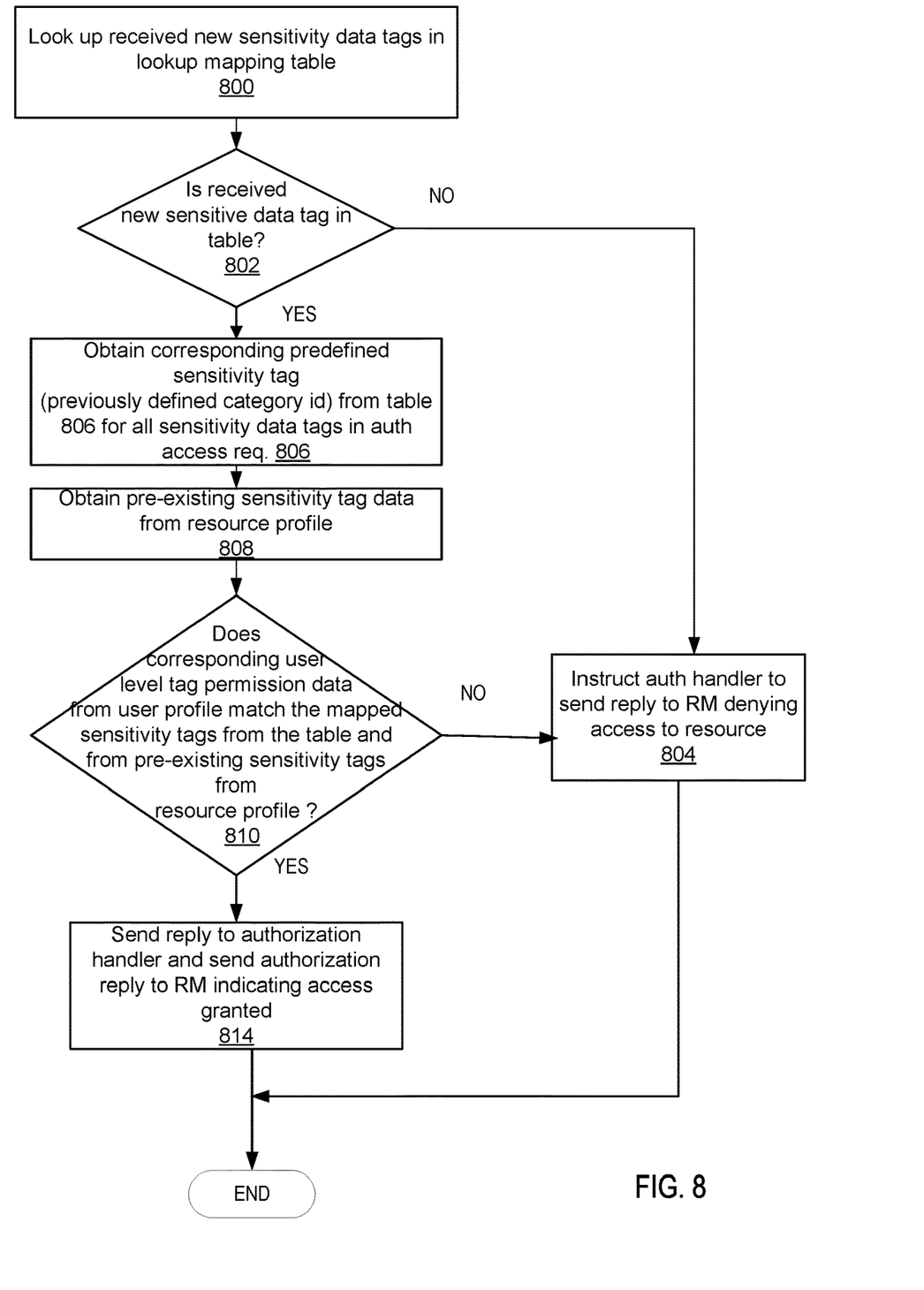
FIG. 8 sets forth a more detailed flowchart of an example process for granting resource access using integration of data sensitivity tags according to aspects of the present disclosure.

Referring now also to FIG. 7 and FIG. 8, FIG. 7 sets forth an example security manager according to aspects of the present disclosure. FIG. 8 sets forth a flowchart of a more detailed example of a process for granting resource access using integration of data sensitivity tags according to aspects of the present disclosure. The method, as with the other methods described herein, can be performed by any suitable component or components and in any suitable order. In this example, permission to a protected resource is granted by verifying that a user has permission to all of the mapped new sensitivity data tags and all categories defined by pre-existing sensitivity tag data associated with the at least one data resource, based on a match with the user level tag permission data.

In this example, data tag values are shown that are compared to determine whether to grant permission to the user for access to the protected resource. In some implementations, the comparison is of tag values to each other and whether they match in value. However, any suitable mechanism may be employed to verify user authority over the mapped new sensitivity data tags and the pre-existing sensitivity data tags associated with the data resource.

Referring again also to FIG. 4, in this example, the authorization request 212 includes new sensitivity tags 206 as a list of tag values 1100, 1101 and 1102. In this example the user profile corresponding to the user ID 230 has corresponding user level tag permission data 232 in the user profile with values 02 and 52 and the pre-existing sensitivity tag for the corresponding resource ID 224 that was previously assigned to the resource in the resource profile database has the sensitivity tag value 02.

As shown in block 800, the method includes looking up the received new sensitivity tags 404 in the tag mapping table 400. For example, each of the tag values 1100, 1101, 1102 is used as an index in the table 400. As shown in block 802 if an index is not found in the lookup table 400, as shown in block 804, a reply is sent denying access to the resource. As shown in block 806, the method includes obtaining corresponding predefined sensitivity data tags from the mapping table 400 using the new sensitivity data tags 206 as indexes. The corresponding predefined sensitivity tags 402 are retrieved as a corresponding mapped new sensitivity data tag form the mapping table 400. In this example, new sensitivity data tags 206 have tag values 1100 and 1101 and both tag values retrieve a same mapped new sensitivity data tag having a tag value of 02. For example, social security information is tagged by the analysis application with new tag value 1100 and email addresses are tagged with a new tag value 1101. Both of the new tag values 1100 and 1101 map to predefined tag value 02. Account balance information is tagged with a new tag value 1102 by the analysis application and is mapped to predefined tag value 52. As such the produced mapped new sensitivity data tags 406 have values 02 and 52 in this example.

As shown in block 808 the method includes using the resource ID in the authorization request to retrieve the pre-existing sensitivity tag data 220 from the resource profile using the resource ID 224 in the authorization request. In this example the corresponding pre-existing sensitivity data tag 220 has a tag value 02 that is stored in the resource profile linked to the resource ID 224 so the retrieved pre-existing sensitivity data tag 220 has retrieved tag value from the resource profile of 02. As shown in block 810, the method includes using the user ID in the authorization request 212 to retrieve corresponding user level tag permission data 232 which in this example are 02 and 52.

The tags value of 02 and 52 from the mapped new sensitivity data tags for the resource and the tag value 02 from the pre-existing sensitivity data tag for the resource are integrated. In this example, an integration operation in the form of a union of tag values and is performed by the sensitivity tag integration processing 512 resulting in a union of tag values of 02 and 52. The union of 02 and 52 is compared to the user level tag permission data 232 which in this case are also tag values 02 and 52 and as such the user has authority over all of the mapped new sensitivity data tags and all of the pre-existing sensitivity data tags in the resource profile. As shown in block 814 a reply is issued with a code to the requesting resource manager that access is granted to the data resource. When the user level tag permission data 232 does not include all of the tag values of the union of tag values from the mapped new sensitivity data tags and those from the pre-existing sensitivity data tags, access is denied as shown in block 804. This means that the user does not have authority over at least one of the new sensitivity data tags in the authorization request.

As disclosed herein, in some implementations, the sensitivity tag mapping data is stored in memory as a list or lookup table data structure as opposed to for example being implemented as a calculating function executed by a processor that calculates the value of the mapped sensitivity tag from the new sensitivity tag value. In one example, each new sensitivity tag is used as an index to a mapping table that maps each new tag to an existing predefined sensitivity tag that is from a set of predefined sensitivity tags already being used by the security manager resulting in a mapped new sensitive data tag. As a result, a list of new sensitive data tags in the authorization request is effectively merged with the pre-existing sensitive data tags which have been previously defined for this specific data set in a resource profile for the security manager. The user must have authority over all of the merged categories associated with the data set to gain access to the protected resource. The security of the computing platform is strengthened by providing a mechanism for new sensitivity data tags to be added to existing data tagging categories for a data resource that has already undergone data tagging.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
producing, by a security manager, at least one mapped new sensitivity data tag for at least one data resource based on an authorization request for the at least one data resource, that comprises at least one new sensitivity data tag associated with the at least one data resource; and
providing permission, by the security manager, to the at least one data resource in response to the authorization request, based on verifying that a user associated with the authorization request has authority over the at least one mapped new sensitivity data tag and over at least one pre-existing sensitivity data tag associated with the at least one data resource.

2. The method of claim 1, wherein producing the at least one mapped new sensitivity data tag comprises converting, the at least one new sensitivity data tag to at least one predefined sensitivity data tag from a group of predefined sensitivity data tags.

3. The method of claim 1, comprising issuing the authorization request comprising the at least one new sensitivity data tag, by a resource manager, and wherein the at least one new sensitivity data tag has a different value from one or more predefined sensitivity data tags for a same data resource.

4. The method of claim 2, comprising obtaining the at least one mapped new sensitivity data tag based on a mapping table that comprises data representing a plurality of stored predefined sensitive data category identifiers each associated with one or more corresponding new sensitivity data tags.

5. The method of claim 2, wherein providing permission comprises:
verifying, by the security manager, user authority over the at least one mapped new sensitivity data tag and the at least one pre-existing sensitivity data tag associated with the data resource based on user level tag permission data; and
sending an authorization reply indicating that access is granted based on the verification.

6. The method of claim 3, wherein providing permission comprises:
verifying that a user has permission to the at least one mapped new sensitivity data tag and all categories defined by pre-existing sensitivity tag data associated with the at least one data resource, based on a match with user level tag permission data; and
sending an authorization reply indicating that access is granted based on the verification.

7. The method of claim 6 comprising, based on the authorization request:
accessing a user profile comprising data representing an allowed user access level and user level tag permission data;
accessing a resource profile comprising data representing on a per data resource basis: a defined class name, a resource name identifying a data set, at least one pre-existing sensitivity tag associated with the data set and a location of the data set; and
providing permission, by the security manager, to the data set based on:
a requested access level in the authorization request matching the allowed user access level, and
the at least one mapped new sensitivity data tag matching the user level tag permission data of the user profile and the at least one pre-existing sensitivity data tag in the resource profile.

8. An apparatus comprising:
a processing device; and
memory operatively coupled to the processing device, wherein the memory stores computer program instructions that, when executed, cause the processing device to:
produce at least one mapped new sensitivity data tag for at least one data resource based on an authorization request for the at least one data resource, that comprises at least one new sensitivity data tag associated with the at least one data resource; and
provide permission to the at least one data resource in response to the authorization request, based on verifying that a user associated with the authorization request has authority over the at least one mapped new sensitivity data tag and over at least one pre-existing sensitivity data tag associated with the at least one data resource.

9. The apparatus of claim 8, wherein the memory stores computer program instructions that, when executed, cause the processing device to:
produce the at least one mapped new sensitivity data tag by at least converting, the at least one new sensitivity data tag to at least one predefined sensitivity data tag from a group of predefined sensitivity data tags.

10. The apparatus of claim 9, wherein the memory stores computer program instructions that, when executed, cause the processing device to:
issue the authorization request comprising the at least one new sensitivity data tag, and wherein the at least one new sensitivity data tag has a different value from one or more predefined data category identifiers for a same data resource.

11. The apparatus of claim 9, wherein the memory stores computer program instructions that, when executed, cause the processing device to,
obtain the at least one mapped new sensitivity data tag based on a sensitivity tag mapping table that comprises data representing a plurality of stored predefined sensitive data category identifiers each associated with one or more corresponding new sensitivity data tags.

12. The apparatus of claim 9, wherein the memory stores computer program instructions that, when executed, cause the processing device to:

provide permission by:
verifying, by a security manager, user authority over the at least one mapped new sensitivity data tag and the at least one pre-existing sensitivity data tag associated with the data resource based on user level tag permission data; and
sending an authorization reply indicating that access is granted based on the verification.

13. The apparatus of claim 10, wherein the memory stores computer program instructions that, when executed, cause the processing device to:

verify that a user has permission to the mapped new sensitivity data tag and all categories defined by pre-existing sensitivity tag data associated with the at least one data resource, based on a match with user level tag permission data; and
send an authorization reply indicating that access is granted based on the verification.

14. The apparatus of claim 13, wherein the memory stores computer program instructions that, when executed, cause the processing device to:

based on the authorization request, cause a security manager to:
access a user profile comprising data representing an allowed user access level and user level tag permission data;
access a resource profile comprising data representing on a per data resource basis: a defined class name, a resource name identifying a data set, at least one pre-existing sensitivity tag and a location of the data set; and
provide permission to the data set based on:
a requested access level in the authorization request matching the allowed user access level, and
the at least one mapped new sensitivity data tag matching the user level tag permission data of the user profile and the at least one pre-existing sensitivity data tag in the resource profile.

15. A computer program product comprising a computer readable storage medium, wherein the computer readable storage medium comprises computer program instructions that, when executed:

produce at least one mapped new sensitivity data tag for at least one data resource based on an authorization request for the at least one data resource, that comprises at least one new sensitivity data tag associated with the at least one data resource; and
provide permission to the at least one data resource in response to the authorization request, based on verifying that a user associated with the authorization request has authority over the at least one mapped new sensitivity data tag and over at least one pre-existing sensitivity data tag associated with the at least one data resource.

16. The computer program product of claim 15, comprising computer program instructions that, when executed:

produce the at least one mapped new sensitivity data tag by at least converting, the at least one new sensitivity data tag to at least one predefined sensitivity data tag from a group of predefined sensitivity data tags.

17. The computer program product of claim 16, comprising computer program instructions that, when executed:

issue the authorization request comprising the at least one new sensitivity data tag, and wherein the at least one new sensitivity data tag has a different value from one or more predefined data category identifiers for a same data resource.

18. The computer program product of claim 17, comprising computer program instructions that, when executed:

obtain the at least one mapped new sensitivity data tag based on a sensitivity tag mapping table that comprises data representing a plurality of stored predefined sensitive data category identifiers each associated with one or more corresponding new sensitivity data tags.

19. The computer program product of claim 15, comprising computer program instructions that, when executed:

provide permission by:
verifying, by a security manager, user authority over the at least one mapped new sensitivity data tag and the at least one pre-existing sensitivity data tag associated with the data resource based on user level tag permission data; and
sending an authorization reply indicating that access is granted based on the verification.

20. The computer program product of claim 15, comprising computer program instructions that, when executed:

based on the authorization request, cause a security manager to:
access a user profile comprising data representing an allowed user access level and user level tag permission data;
access a resource profile comprising data representing on a per data resource basis: a defined class name, a resource name identifying a data set, at least one pre-existing sensitivity tag and a location of the data set; and
provide permission to the data set based on:
a requested access level in the authorization request matching the allowed user access level, and
the at least one mapped new sensitivity data tag matching the user level tag permission data of the user profile and the at least one pre-existing sensitivity data tag in the resource profile.

* * * * *